United States Patent
Hirano et al.

(10) Patent No.: US 9,723,862 B2
(45) Date of Patent: Aug. 8, 2017

(54) MULTILAYER STRUCTURE INSTANT NOODLE AND METHOD FOR MANUFACTURING SAME

(75) Inventors: Yukio Hirano, Osaka (JP); Kunihiko Yoshida, Osaka (JP); Takeshi Asahina, Osaka (JP); Mitsuru Tanaka, Osaka (JP)

(73) Assignee: Nissin Foods Holdings Co., Ltd., Osaka-shi (JP)

( * ) Notice: Subject to any disclaimer, the term of this patent is extended or adjusted under 35 U.S.C. 154(b) by 0 days.

(21) Appl. No.: 14/418,013

(22) PCT Filed: Jul. 31, 2012

(86) PCT No.: PCT/JP2012/069482
§ 371 (c)(1),
(2), (4) Date: Feb. 25, 2015

(87) PCT Pub. No.: WO2014/020702
PCT Pub. Date: Feb. 6, 2014

(65) Prior Publication Data
US 2015/0257418 A1 Sep. 17, 2015

(51) Int. Cl.
 *A23L 7/109* (2016.01)
 *A23L 7/113* (2016.01)
 (Continued)

(52) U.S. Cl.
 CPC ............... *A23L 1/1606* (2013.01); *A23L 5/00* (2016.08); *A23L 7/11* (2016.08); *A23L 7/113* (2016.08); *A23P 20/20* (2016.08); *A23V 2002/00* (2013.01)

(58) Field of Classification Search
 CPC .............................. A23L 1/1606; A23L 1/162
 See application file for complete search history.

(56) References Cited

U.S. PATENT DOCUMENTS

| 4,244,974 A | * | 1/1981 | Minami | ............... A23L 1/1606 |
| | | | | 426/272 |
| 4,271,205 A | * | 6/1981 | Kaneko | ..................... A23L 1/16 |
| | | | | 426/445 |

(Continued)

FOREIGN PATENT DOCUMENTS

| CN | 101541190 A | 9/2009 |
| EP | 2356913 A1 | 8/2011 |

(Continued)

OTHER PUBLICATIONS

Medvedev, G.M., The Technology of Macaroni Production, Moscow, "Kolos", 2000, p. 214-221.

(Continued)

*Primary Examiner* — D. Lawrence Tarazano
*Assistant Examiner* — Stephanie Cox
(74) *Attorney, Agent, or Firm* — Knobbe, Martens, Olson & Bear, LLP (57) ABSTRACT

A multilayer structure instant noodle which is manufactured through steps in which an inner layer noodle sheet is sandwiched between outer layer noodle sheets such that these noodle sheets are combined to form a single noodle sheet, the single noodle sheet is flat-rolled so as to form noodle lines, and the noodle lines are gelatinized and dried, and a blending amount of salt in the inner layer noodle sheet is higher than a blending amount of salt in the outer layer noodle sheet.

6 Claims, 4 Drawing Sheets

(51) Int. Cl.
*A23L 1/16* (2006.01)
*A23L 5/00* (2016.01)
*A23P 20/20* (2016.01)

(56) References Cited

U.S. PATENT DOCUMENTS

| | | | |
|---|---|---|---|
| 4,483,879 A * | 11/1984 | Sugisawa | A23L 1/16 426/451 |
| 4,992,285 A * | 2/1991 | Larsen | A21C 9/045 426/275 |
| 5,514,397 A * | 5/1996 | Shapiro | A21D 13/0022 426/249 |
| 5,543,168 A * | 8/1996 | Yamasaki | A23L 1/1606 426/275 |
| 6,165,522 A | 12/2000 | Lira | |
| 6,254,906 B1 * | 7/2001 | Neve de Mevergnies | A23L 1/1606 426/451 |
| 8,236,363 B2 * | 8/2012 | Miyazaki | A23L 1/162 426/451 |

FOREIGN PATENT DOCUMENTS

| | | |
|---|---|---|
| JP | A-53-081641 | 7/1978 |
| JP | B-56-009096 | 2/1981 |
| JP | A-08-009909 | 1/1996 |
| JP | A-11-192063 | 7/1999 |
| JP | A-2000-189089 | 7/2000 |
| JP | A-2000-210041 | 8/2000 |
| JP | A-2000-262232 | 9/2000 |
| JP | A-2007-202519 | 8/2007 |
| JP | B-4234051 | 3/2009 |
| WO | WO 2011/114690 A1 | 9/2011 |

OTHER PUBLICATIONS

Decision of Grant in Russian Patent Application No. 2015105985, mailed Jun. 29, 2015.
Hidetsugu Fuwa et al., Encyclopedia of starch science p. 197-198, Mar. 20, 2003.
International Search Report in PCT/JP2012/069482 dated Oct. 30, 2012.
International Preliminary Report on Patentability in PCT/JP2012/069482 dated Nov. 25, 2014.
Office Action in Chinese Patent Application No. 201280076152.9, mailed Aug. 18, 2015.
International Search Report in European Patent Application No. 12882101.2, mailed Oct. 1, 2015.

* cited by examiner

MULTILAYER STRUCTURE INSTANT NOODLE AND METHOD FOR MANUFACTURING SAME

This application is the U.S. National Phase under 35 U.S.C. §371 of International Application PCT/JP2012/069482, filed Jul. 31, 2012, designating the U.S., and published in Japanese as WO 2014/020702 on Feb. 6, 2014.

TECHNICAL FIELD

The present invention relates to a multilayer structure instant noodle and the manufacturing method thereof.

BACKGROUND ART

Instant noodles are made through the steps in which raw noodle lines obtained by cutting are gelatinized and then dried by a drying method such as fry drying, hot-air drying or freeze drying. Instant noodles can be easily eaten only by cooking in which instant noodles are soaked with hot water and then left for about 3 to 5 minutes, or are boiled for about 1 to 3 minutes. Accordingly, instant noodles are an extremely convenient instant food. It is important factor for instant noodles to fully reconstitute a lush texture within the aforementioned predetermined cooking time. However, when noodle lines are thick, sufficient texture is not reconstituted only by soaking instant noodles with hot water and then leaving it for about 3 to 5 minutes, and non-reconstituted center lines can remain in thick noodle lines. In recent years, the demand for instant noodles made of thick noodle lines has particularly grown due to the diversification of consumers' needs, and a method for improving the reconstitution property has become a very useful technique in the field of instant noodles.

The technique to improve the reconstitution property of instant noodles has been already developed, and examples thereof include the method using salt. Patent Literature 1 discloses the manufacturing method of noodles with a quick reconstitution property in which noodles are boiled with salt-free water and then boiled with brine having a certain salt content, and the noodles with a quick reconstitution property obtained by the manufacturing method thereof. Patent Literature 2 discloses the manufacturing method of instant dried noodles in which noodle sheets or noodle lines made by a conventional method are soaked in the brine at a high temperature of 60° C. to 130° C. and then dried. Patent Literature 3 discloses the instant noodles manufactured through the steps in which noodle lines are boiled with a solution having a high salt content and then washed with water. Patent Literature 4 discloses the manufacturing method of instant noodles characterized in that raw noodle lines are steamed, soaked and boiled in a salted aqueous solution or a salt-containing aqueous emulsion, subjected to liquid removal, preliminarily dried at a temperature of 40° C. to 100° C., and then mainly dried at a temperature of 110° C. to 200° C.

CITATION LIST

Patent Literature

[Patent Literature 1]
Japanese Patent No. 4234051
[Patent Literature 2]
Japanese Unexamined Patent Application, First Publication No. Sho53-81641
[Patent Literature 3]
Japanese Unexamined Patent Application, First Publication No. 2000-189089
[Patent Literature 4]
Japanese Examined Patent Application, Second Publication No. Sho56-9096

SUMMARY OF INVENTION

Technical Problem

The present invention has an object to provide a technique for further improving the reconstitution property of instant noodles. As one of the reasons for preventing good reconstitution property of instant noodles, it has been considered that the gelatinization of starch at the inside of noodle lines does not sufficiently proceed in a steaming step and a boiling step. This phenomenon is significant particularly when noodle lines are thick.

Solution to Problem

The present inventors have found the new finding that, in the manufacturing step of instant noodles, the gelatinization of starch in noodle lines proceeds as a blending amount of salt relative to a main ingredient increases. Also, the present inventors have found that it is possible to obtain the improvement effect of the reconstitution property of instant noodles, which was not conventionally obtained, by using the aforementioned finding and the predetermined layered structure for instant noodles, and have completed the present invention.

In other words, the present invention relates to the following.

[1] A multilayer structure instant noodle which is manufactured through the steps in which an inner layer noodle sheet is sandwiched between outer layer noodle sheets such that these noodle sheets are combined to form a single noodle sheet, the single noodle sheet is flat-rolled so as to form noodle lines, and the noodle lines are gelatinized and dried, wherein
a blending amount of salt in the inner layer noodle sheet is higher than a blending amount of salt in the outer layer noodle sheets.
[2] The multilayer structure instant noodle according to [1], wherein
the inner layer noodle sheet and outer layer noodle sheets include: at least one main ingredient selected from the group consisting of wheat flour, buckwheat flour, rye flour, barley flour and starch; salt; and water.
[3] The multilayer structure instant noodle according to [1] or [2], wherein the inner layer noodle sheet does not contain gelatin or *psyllium* as a component.
[4] The multilayer structure instant noodle according to any one of [1] to [3], wherein a value, which is obtained by subtracting the blending amount of the salt in the outer layer noodle sheets from the blending amount of the salt in the inner layer noodle sheet relative to 100 parts by weight of the main ingredient, is 2 parts by mass or more and 14 parts by weight or less.
[5] The multilayer structure instant noodle according to any one of [1] to [3], wherein a value, which is obtained by subtracting the blending amount of the salt in the outer layer noodle sheets from the blending amount of the salt in the inner layer noodle sheet relative to 100 parts by weight of the main ingredient is 2 parts by mass or more and 5 parts by weight or less.

[6] The multilayer structure instant noodle according to any one of [1] to [5], wherein the blending amount of the salt in the inner layer noodle sheet is within a range of 3.5 to 14 parts by mass relative to 100 parts by weight of the main ingredient.
[7] The multilayer structure instant noodle according to any one of [1] to [6], wherein the blending amount of the salt in the inner layer noodle sheet is within a range of 4 to 12 parts by mass relative to 100 parts by weight of the main ingredient.
[8] The multilayer structure instant noodle according to any one of [1] to [7], wherein the ratio of the total thickness of the outer layer noodle sheets before sandwiching the inner layer noodle sheet between the outer layer noodle sheets to the thickness of the inner layer noodle sheet is within a range of 2:1 to 2:8.
[9] A manufacturing method of a multilayer structure instant noodle, including:
a step (1) of forming an inner layer noodle sheet and outer layer noodle sheets;
a step (2) of sandwiching the inner layer noodle sheet between the outer layer noodle sheets such that these noodle sheets are combined to form a single noodle sheet;
a step (3) in which the combined noodle sheet having a multilayer structure is further flat-rolled and then cut out so as to form raw noodle lines;
a step (4) of gelatinizing the raw noodle lines; and
a step (5) of drying the gelatinized noodle lines, wherein
a blending amount of salt in the inner layer noodle sheet is higher than a blending amount of salt in the outer layer noodle sheets.
[10] The manufacturing method of a multilayer structure instant noodle according to [9], wherein the inner layer noodle sheet and outer layer noodle sheets include: at least one main ingredient selected from the group consisting of wheat flour, buckwheat flour, rye flour, and barley flour and starch; salt; and water.
[11] The manufacturing method of a multilayer structure instant noodle according to [9] or [10], wherein the inner layer noodle sheet does not contain gelatin or *psyllium* as a component.
[12] The manufacturing method of a multilayer structure instant noodle according to any one of [9] to [11], wherein a value, which is obtained by subtracting the blending amount of the salt in the outer layer noodle sheets from the blending amount of the salt in the inner layer noodle sheet relative to 100 parts by weight of the main ingredient, is 2 parts by mass or more and 14 parts by weight or less.
[13] The manufacturing method of a multilayer structure instant noodle according to any one of [9] to [12], wherein the blending amount of the salt in the inner layer noodle sheet is within a range of 3.5 to 14 parts by mass relative to 100 parts by weight of the main ingredient.
[14] The manufacturing method of a multilayer structure instant noodle according to any one of [9] to [13], wherein the blending amount of the salt in the inner layer noodle sheet is within a range of 4 to 12 parts by mass relative to 100 parts by weight of the main ingredient.
[15] The manufacturing method of a multilayer structure instant noodle according to any one of [9] to [14], wherein the ratio of the total thickness of the outer layer noodle sheets before sandwiching the inner layer noodle sheet between the outer layer noodle sheets to the thickness of the inner layer noodle sheet is within a range of 2:1 to 2:8.

Advantageous Effects of Invention

According to the present invention, it is possible to sufficiently gelatinize the starch particularly at the inside of the thick noodle lines and to obtain the instant noodles having a significantly improved reconstitution property.

DESCRIPTION OF EMBODIMENTS

The present invention is characterized in that a multilayer structure instant noodle is manufactured through the steps in which an inner layer noodle sheet is sandwiched between outer layer noodle sheets such that these noodle sheets are combined to form a single noodle sheet, the single noodle sheet is flat-rolled so as to form noodle lines, and the noodle lines are gelatinized and dried, and a blending amount of salt in the inner layer noodle sheet is higher than the blending amount of salt in the outer layer noodle sheet.

Hereinafter, an embodiment of the multilayer structure instant noodle of the present invention will be described together with the reasons why the present inventors have employed the structure. In the present invention, "mass" is used as synonymous with "weight", and "% by weight" is used as synonymous with "% by weight".

Blending Amount of Salt

The present invention is characterized in that a blending amount of salt in the inner layer noodle sheet when the total amount of the main ingredient of the inner layer noodle sheet is regarded as 100 parts by mass is higher than a blending amount of salt in the outer layer noodle sheets when the total amount of the main ingredient of the outer layer noodle sheets is regarded as 100 parts by mass. Examples of the main ingredient include powder materials such as wheat flour, buckwheat flour, rye flour, barley flour and starch, and these can be used alone or in combination. As wheat flour, it is possible to use all types used in the manufacturing of noodles. As starch, it is possible to use all types used in the manufacturing of noodles. Examples of starch include potato starch, tapioca starch, waxy corn starch, corn starch, wheat starch, sago starch and rice starch. Moreover, it is possible to use modified starch, which is obtained by using the aforementioned starch as a raw material, such as gelatinized starch, etherified starch, esterified starch, crosslinked starch and oxidized starch. In the present invention, a blending amount of salt relative to the main ingredient is important.

Herein, a blending amount of salt in the outer layer noodle sheets can be 0 part by weight.

In general, it is well known that various salts affect the gelatinization of starch in an aqueous solution, and it is said that salt (sodium chloride) increases the gelatinization temperature. This phenomenon is considered to occur because structural water increases by salts and free water decreases ("encyclopedia of starch science" P198).

However, this phenomenon is the behavior only in an aqueous solution having a lot of water. The present inventors firstly carried out the following preliminary experiment in order to study the effect of salt on the gelatinization of starch in the noodle lines for instant noodles which contain water at generally about 30 to 45 mass %.

Preliminary Experiment

Each of the kneading water dissolving salt at 2, 4, 6, 8 and 10 parts by weight was added to 100 parts by weight of wheat flour, i.e. the main raw material, followed by kneading so as to obtain noodle doughs. These noodle doughs were respectively combined to obtain noodle sheets followed by flat-rolling. The obtained respective noodle sheets having a thickness of 1.2 mm were cut out by using by a square blade No. 20, so as to obtain noodle lines. The respective noodle lines were steamed at 100° C. for 2 minutes, and then the gelatinization degrees were measured. Table 1 shows the measurement results.

TABLE 1

| Blending Amount of Salt (parts by mass) | Gelatinization Degree (%) |
|---|---|
| 2 | 62.1 |
| 4 | 64.0 |
| 6 | 77.8 |
| 8 | 80.0 |
| 10 | 81.4 |

In contrast to the aforementioned behavior in an aqueous solution, it was found that the gelatinization of starch in the noodle lines proceeded as the blending amount of salt increased. In addition to this finding, by modifying noodle sheets and noodle lines to have the following multilayer structure, it is possible to achieve the object of the present invention.

Multilayer Structure

Figure 1:
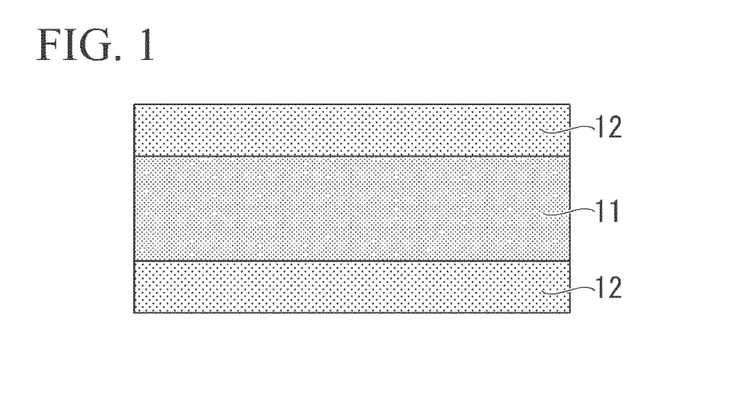
FIG. 1 is an example of the conceptual diagram illustrating the cross-section of a noodle sheet in the manufacturing step of the present invention.

In the present invention, the multilayer structure refers to a layered structure having three or more layers (FIG. 1), and the inner layer noodle sheet is sandwiched between the outer layer noodle sheets such that these noodle sheets are combined to form the single noodle sheet. The inner layer can be comprised of a single layer or plural layers. The ratio of the total thickness of the outer layer noodle sheets before sandwiching the inner layer noodle sheet between the outer layer noodle sheets to the thickness of the inner layer noodle sheet is preferably within a range of 2:1 to 2:8, more preferably 2:1 to 2:4, and much more preferably 2:1 to 2:3.

In the present invention, it is important that the blending amount of the salt in the inner layer noodle sheet is higher than the blending amount of the salt in the outer layer noodle sheets. When the blending amount of the salt in the inner layer noodle sheet is lower than or equal to the blending amount of the salt in the outer layer noodle sheets, the outer layer noodle sheets are promptly gelatinized, and the pasty layers cover the noodle lines in the gelatinizing step following the steps in which the inner layer noodle sheet and the outer layer noodle sheets are combined, flat-rolled, and cut out so as to form the noodle lines. It is considered that these pasty layers prevent steam or hot water from penetrating into the inner layer in the gelatinizing step, and consequently, the gelatinization of the inner layer does not proceed, and the effects of the present invention cannot be achieved.

It is preferable that the value, which is obtained by subtracting the blending amount of the salt in the outer layer noodle sheets from the blending amount of the salt in the inner layer noodle sheet relative to 100 parts by weight of the main ingredient, be 2 parts by mass or more and 14 parts by weight or less. When the value, which is obtained by subtracting the blending amount of the salt in the outer layer noodle sheets from the blending amount of the salt in the inner layer noodle sheet relative to 100 parts by weight of the main ingredient, is within the aforementioned range, the reconstitution property of instant noodles becomes good. Also, it is preferable that the value, which is obtained by subtracting the blending amount of the salt in the outer layer noodle sheets from the blending amount of the salt in the inner layer noodle sheet relative to 100 parts by weight of the main ingredient, be 2 parts by mass or more and 5 parts by weight or less. When the value, which is obtained by subtracting the blending amount of the salt in the outer layer noodle sheets from the blending amount of the salt in the inner layer noodle sheet relative to 100 parts by weight of the main ingredient, is within the aforementioned range, the reconstitution property of instant noodles becomes good, and the salty taste of noodles is not strong and moderate.

The blending amount of the salt in the inner layer noodle sheet is preferably within a range of 3.5 to 14 parts by mass relative to 100 parts by weight of the main ingredient, and more preferably within a range of 4 to 12 parts by mass. When the blending amount of the salt in the inner layer noodle sheet is lower than 3.5 parts by mass, the reconstitution property of instant noodles becomes bad. When the blending amount of the salt in the inner layer noodle sheet is higher than 14 parts by mass, the salty taste of noodles becomes very strong at the time of eating. Also, when the blending amount of the salt in the inner layer noodle sheet is higher than 12 parts by mass, the reconstitution property of instant noodles is good, but the noodle sheets or noodle lines are likely to be cut in the noodle manufacturing, and the continuous manufacturing becomes difficult.

Salt Content

Also, in the instant noodles of the present invention, it is possible to keep the low salt content of the entire noodle bulk after drying. Specifically, the salt content of the entire noodle bulk is preferably 5.5 mass % or lower. When the salt content of the entire noodle bulk is higher than 5.5 mass % or lower, the salt content of hot water becomes high due to the salt elution from noodles to hot water, and the hot water used for the reconstitution should be thrown away once. Then, fresh hot water should be added again, and subsequently, powder soup and concentrated liquid soup, etc. should be added, which does not meet the consumers' needs for convenient cooking of instant noodles. Also, in the noodle bulk comprised of noodle lines having a thickness within a range of 1.0 to 3.0 mm, the salt content is preferably 3.0 mass % or lower, and much more preferably 1.7 mass % or lower. In thick noodle lines, a surface area per mass to contact hot water during reconstitution is small as compared to thin noodle lines. For this reason, the elution amount of salt from noodles to hot water during reconstitution is small as compared to thin noodle lines, and thus, the salty taste of noodles becomes too strong at the time of eating. In the present invention, the salt content of the entire noodle lines means the mass ratio of salt to the total mass of instant noodles after completion of the drying step, and can be measured by a coulometric titration method.

Coulometric Titration Method

The instant noodle bulk sample was appropriately pulverized with a mill, and was homogenized in a plastic bag. About 5 g of this sample was precisely weighed in a crucible of 50 mL, and was preliminary ashed on a hot plate until smoke did not reek, and then was ashed in a muffle furnace at 550° C. overnight. After allowing the ashed product to cool, the ashed product was diluted with distilled water in a measuring cylinder to 50 ml total. This solution was filtrated (with Toyo filter paper No. 5A) to thereby obtain the sample for analysis. The purpose-built syringe (volume 20 μL) was rinsed out with a separate portion of the aforementioned sample for analysis, and the sample for analysis was injected using the syringe to the salinity analyzer (SAT-500: manufactured by DKK-TOA Corporation) so as to carry out the measurement. The measurement was carried out using two-point equilibrium analysis. When the difference between the two points was within the range of ±0.010, the average value of the two points was employed as the measured value of the salinity analyzer (w/v %). When the difference between the two points was beyond the range of ±0.010, the remeasurement was carried out. From the obtained measured value of the salinity analyzer, the salt content was calculated by using the following equation.

Salt Content (mass %)={Measured Value of Salinity Analyzer (w/v %)×Dilution Amount (50 mL)}÷Sample Amount (g)} [Math. 1]

Patent Literature 1 discloses the noodles with a quick reconstitution property in which the salt content at the inside of the noodle lines is lower than the salt content at the peripheral part of the noodle lines and the salt content of noodles is within a range of 7 to 25 mass %. However, in the noodles with a quick reconstitution property of Patent Literature 1, the salt content is at least 7 mass %, and this highly concentrated salt is eluted to hot water after cooking. Therefore, it is basically necessary to throw away hot water through a colander. On the other hand, in the instant noodle of the present invention, it is possible to reduce the salt content of the entire noodle bulk to 5.5 mass % or lower. In the instant noodles having such salt content, the elution amount of salt to hot water after cooking is not so much, and it is not necessary to throw away the hot water used for the reconstitution through a colander. In other words, it is possible to eat the reconstituted noodles directly or after adding powder soup, etc. to the reconstituted noodles, which meet the consumers' needs for convenient and quick cooking of instant noodles. The salty taste of the reconstituted noodles is preferable as instant noodles.

In the present invention, the cross-sectional shape of the noodle lines is not particularly limited, examples thereof include a rectangular shape, a circular shape and an elliptical shape.

The thickness of the noodle lines of the present invention is not particularly limited, but for example, the thickness can be within the aforementioned range of 1.0 to 3.0 mm. Even when having a thickness within the range of 1.5 to 3.0 mm, i.e. being very thick as instant noodles, the noodle lines can be well reconstituted under general reconstitution conditions, and can be eaten. Hereinafter, the manufacturing method of the instant noodles of the present invention will be described.

Blending of Raw Materials

In the present invention, any raw materials used conventionally for instant noodles can be used for all the noodle sheets that constitute the multilayer. Examples thereof include the aforementioned main ingredient, salt and necessary auxiliary ingredients such as potassium carbonate, sodium carbonate, sodium hydrogen carbonate, phosphates (potassium and sodium salts of phosphoric acids), polymeric phosphates (such as polyphosphate and pyrophosphate), emulsifiers, thickening stabilizers, antioxidants, colorants, pH-adjusting agents, seasoning, reinforcing agents, gluten, thickening agents, dyes and cooling oils. The necessary auxiliary ingredients are dissolved together with salt in the kneading water which is added to the main ingredient, or added to the main ingredient separately from the kneading water. In the respective noodle sheets, it is possible to vary the blending amounts of the raw materials other than salt as well as the blending amount of salt. In addition, it is possible to vary the raw material to be blended.

Kneading

According to any conventional manufacturing method of instant noodles, the kneading water and other auxiliary ingredients are added to the aforementioned main ingredient, and then, the kneading is carried out by using a mixer, to thereby form the noodle dough for each of noodle sheets.

Formation of Noodle Sheets

Then, the outer layer noodle sheet and the inner layer noodle sheet are formed. These noodle sheets can be obtained by combining the noodle doughs obtained by the kneading and flat-rolling the combined doughs with single or plural flat-rollers. Alternatively, these noodle sheets can be obtained by extruding the noodle dough obtained by the kneading with an extruder. In the present invention, it is important that the blending amount of salt in the inner layer noodle sheet when the total amount of the main ingredient of the inner layer noodle sheet is regarded as 100 parts by mass is higher than the blending amount of salt in the outer layer noodle sheets when the total amount of the main ingredient of the outer layer noodle sheets is regarded as 100 parts by mass. It is preferable that the blending of salt into the noodle sheets be carried out by adding salt to the kneading water at the blending step of the aforementioned raw materials. Also, the blending of salt into the noodle sheets can be carried out by soaking the noodle sheets before combination in brine or spraying brine to the noodle sheets before combination.

Combination

The inner layer noodle sheet is sandwiched between the outer layer noodle sheets, and these noodle sheets are combined by using a combined flat-roller to form a single noodle sheet. In the present invention, the inner layer can be a double layer, a triple layer or a multilayer having 4 or more layers.

Flat-Rolling and Cutting Out

The aforementioned multilayer structure noodle sheet obtained by the combination is further flat-rolled, and then is cut out so as to form raw noodle lines. The flat-rolling of the multilayer structure noodle sheet can be carried out by using a flat-roller machine, for example. Also, the cutting out of the flat-rolled noodle sheet can be carried out by using a cutting blade roll, etc., for example.

Gelatinization

Then, the raw noodles lines are gelatinized. In the present invention, it is possible to use a steaming step and a boiling step alone or in combination. In the steaming step, saturated steam or superheated steam is available.

In the present invention, examples of the steaming step include the step in which a conventional steaming process can be carried out for instant noodles, and for example, the noodle lines are gelatinized by the steam having a temperature of 100° C. to 200° C.

Also, in the present invention, examples of the boiling step include a step of carrying out a boiling process using boiling water. The time required for the gelatinization treatment greatly varies depending on the thickness, etc. of the noodle lines, but it is preferable that the step be carried out for the time within a range of several tens seconds to ten and several minutes.

Drying

The gelatinized noodle lines are dried. In the present invention, the kind of the drying step is not particularly limited, and it is possible to use any drying method used conventionally for the manufacturing of instant noodles. Specific examples of a drying method include fry drying and non-fry drying such as hot-air drying, freeze drying, microwave drying and air drying at low temperature. The drying step can be carried out by using the aforementioned drying methods in combination. The specific conditions for the drying step are not particularly limited, but for example, it is usual to carry out a fry drying process at about 130° C. to 160° C. for about 1 to 3 minutes and a hot-air drying process at about 60° C. to 140° C. for about 15 to 180 minutes. The moisture content of the dried noodle lines is set to about 1 to 5 mass % in the case of fry drying process and about 5 to 10 mass % in the case of a hot-air drying process.

EXAMPLES

Hereinafter, the present invention will be described in more details with reference to the examples, but the present invention is not limited to these examples.

Experiment 1 <Verification of Effects in Fry Noodles>

Example 1-1

The kneading water 450 mL made by dissolving salt 50 g and the polymeric phosphate 5 g was added in the main ingredient 1 kg made of wheat flour 750 g and starch 250 g, and the mixture was well kneaded by a mixer, to thereby obtain the noodle dough. This noodle dough was molded to form the noodle sheet shape having the thickness of 4 mm which was used as the inner layer noodle sheet. Next, the kneading water 410 mL made by dissolving the polymeric phosphate 5 g was added in the main ingredient powder 1 kg made of wheat flour 750 g and starch 250 g, and the mixture was well kneaded by a mixer, to thereby obtain the noodle dough. This noodle dough was molded and flat-rolled to form the two outer layer noodle sheets having the thickness of 4 mm. The former inner layer noodle sheet having the thickness of 4 mm and the latter outer layer noodle sheets having the thickness of 4 mm were combined so as to form the triple layer noodle sheet of outer layer/inner layer/outer layer.

This triple layer noodle sheet was strongly flat-rolled by the flat-roller machine so as to adjust the final thickness of the noodle sheet after the flat-rolling to 1.7 mm. This noodle sheet was cut out by the cutting blade roll of the square blade No. 9, to thereby obtain the raw noodle lines. This raw noodle lines were steamed for 1 minute and 30 seconds, to thereby obtain the steamed noodle lines. These steamed noodle lines were soaked in the boiling bath at 90° C. for 5 seconds, and subsequently was soaked in the loosening solution. Then, the noodle lines were cut, and the noodles of one feed 150 g were charged in the retainer having the capacity of 380 ml. Thereafter, the noodle was fried and dried in the palm oil at the temperature of about 150° C. for 2 minutes. The obtained instant fried noodles were referred to as Example 1-1.

Comparative Example 1-1

The instant fried noodles were obtained in the same blending and steps as in Example 1-1 except that the amount of salt in the outer layer noodle sheet relative to the main ingredient 1 kg was set to 28 g (the kneading water 435 mL) and the amount of salt in the inner layer noodle sheet relative to the main ingredient 1 kg was set to 28 g (the kneading water 435 mL). The obtained instant fried noodles were referred to as Comparative Example 1-1.

Comparative Example 1-2

The instant fried noodles were obtained in the same blending and steps as in Example 1-1 except that the amount of salt in the outer layer noodle sheet relative to the main ingredient 1 kg was set to 50 g (the kneading water 450 mL) and no salt is added in the inner layer noodle sheet (the kneading water 410 mL). The obtained instant fried noodles were referred to as Comparative Example 1-2.

Sensory Evaluation

The respective instant fried noodles of Example 1-1 and Comparative Examples 1-1 and 1-2 were charged into the cup containers made of styrol, and the powdered soup 7.1 g was added thereto, followed by pouring 400 mL of hot water. Then, the respective cup containers were covered with the caps, and were allowed to stand for 5 minutes. The six panelists well stirred and ate the noodles reconstituted by standing for 5 minutes. Then, the texture evaluations were carried out.

The evaluations were individually carried out by using five steps, and the average of the six evaluations was calculated and rounded. The evaluation criteria were as follows. 1: The noodles were hard and were not reconstituted. 2: The noodles were partially hard and were not reconstituted. 3: The noodles were slightly hard, but were reconstituted. 4: The noodles were almost reconstituted. 5: The noodles were well reconstituted. The results are shown in Table 2.

TABLE 2

| | Blending Amount of Salt relative to 100 parts by mass of Main Ingredient (parts by mass) | | Salt | | |
| --- | --- | --- | --- | --- | --- |
| | Outer Layer Noodle Sheet | Inner Layer Noodle Sheet | Content (mass %) | Sensory Evaluation | Comments |
| Example 1-1 | 0 | 5 | 0.58 | 5 | Reconstitution was good. |
| Comparative Example 1-1 | 2.8 | 2.8 | 1.08 | 2.5 | Core parts of noodle lines were hard. |
| Comparative Example 1-2 | 5 | 0 | 1.16 | 2 | Core parts of noodle lines were hard, and water was not penetrated. |

Analysis Using Electron Microscope

Figure 2A:
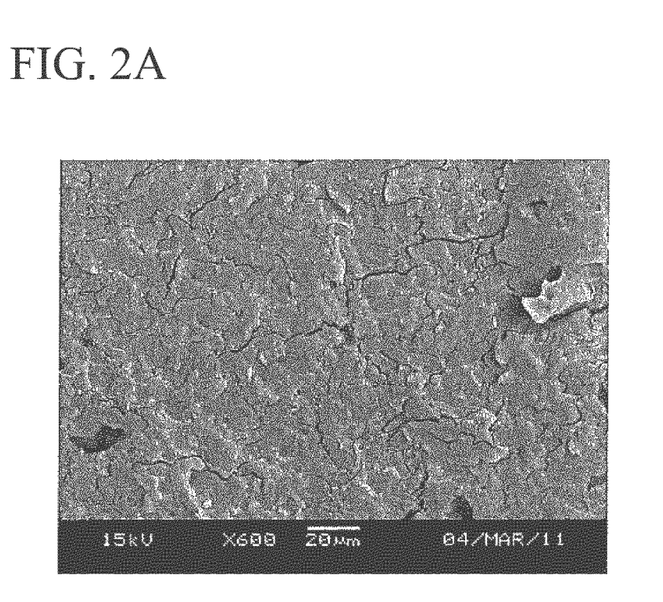
FIG. 2A is the scanning electron microscope photograph obtained by shooting the cross-section of the inner layer of the noodle line immediately after steaming in Example 1-1.
Figure 2B:
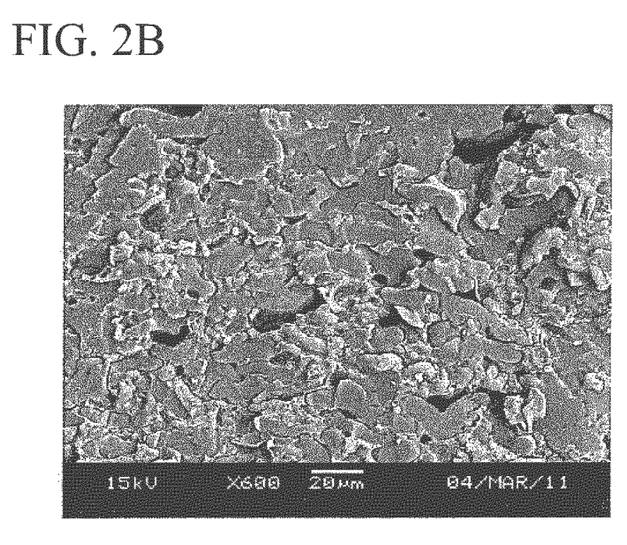
FIG. 2B is the scanning electron microscope photograph obtained by shooting the cross-section of the outer layer of the noodle line immediately after steaming in Example 1-1.
Figure 3A:
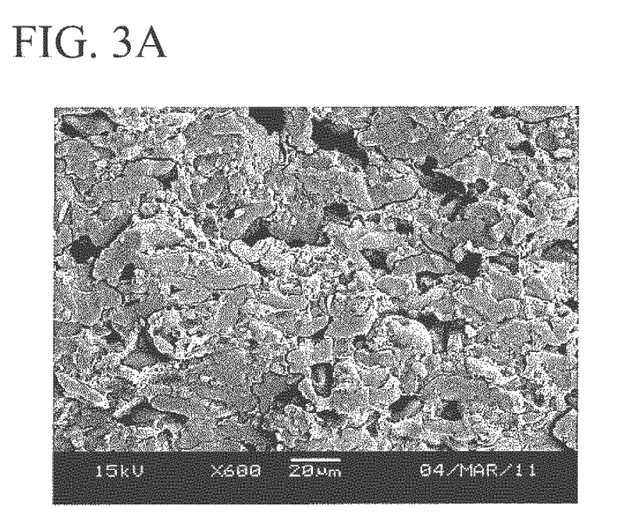
FIG. 3A is the scanning electron microscope photograph obtained by shooting the cross-section of the inner layer of the noodle line immediately after steaming in Comparative Example 1-1.
Figure 3B:
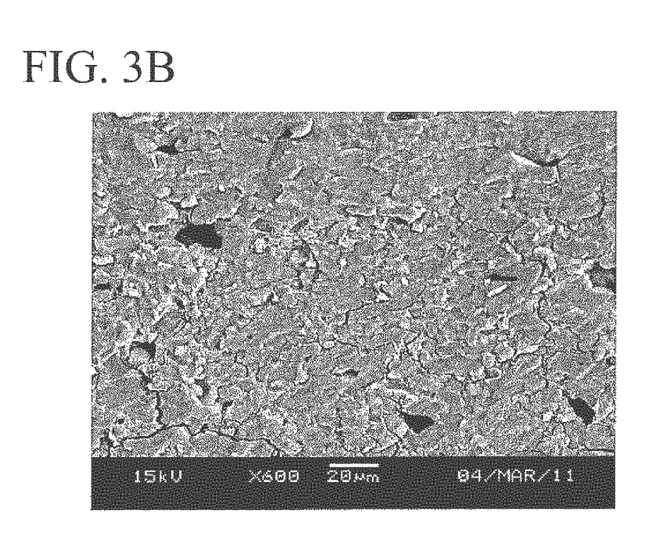
FIG. 3B is the scanning electron microscope photograph obtained by shooting the cross-section of the outer layer of the noodle line immediately after steaming in Comparative Example 1-1.
Figure 4A:
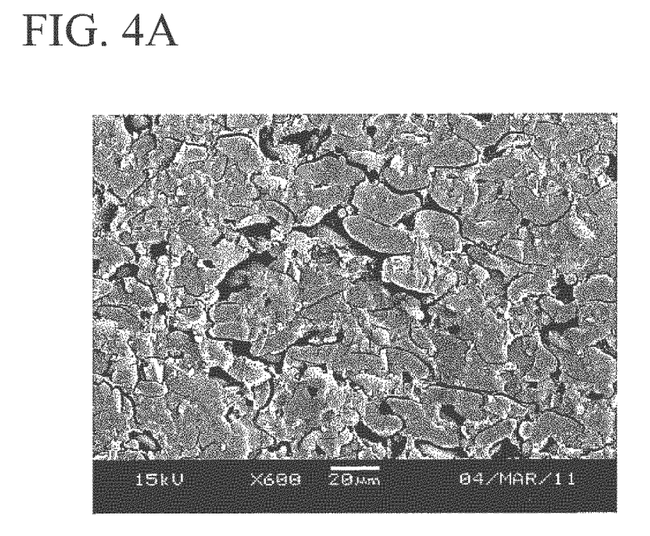
FIG. 4A is the scanning electron microscope photograph obtained by shooting the cross-section of the inner layer of the noodle line immediately after steaming in Comparative Example 1-2.
Figure 4B:
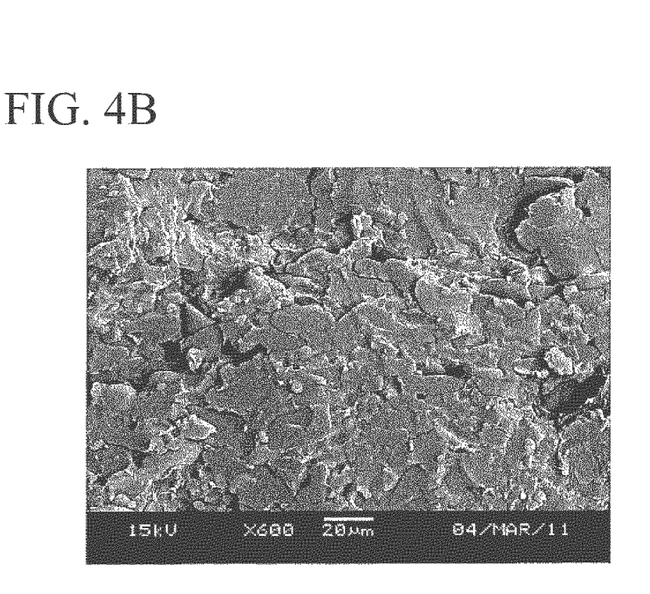
FIG. 4B is the scanning electron microscope photograph obtained by shooting the cross-section of the outer layer of the noodle line immediately after steaming in Comparative Example 1-2.

The respective noodle lines with several centimeters right after the steaming were sampled in Example 1-1. Comparative Example 1-1 and Comparative Example 1-2. These sampled noodle lines were quickly frozen at −40° C. in the quick freezing storage (the quick freezer named BLIZZAR; manufactured by C&C). The both ends of the completely frozen noodle lines were held by the hands wearing the cooled latex gloves in an environment of about −40° C., and the physical force was applied to the frozen noodle so as to fracture the central part of the noodle line and to obtain the fracture surfaces. Then, the fractured frozen noodle lines were freeze-dried over 10 hours by using the freeze-dryer (FD81; manufactured by Tokyo Rikakikai Co. Ltd.), and the final degree of vacuum was adjusted to 10 Pa or lower. The cross-sections of the frozen noodle lines were subjected to the vacuum gold deposition for 90 seconds at the constant current of 10 mA by using ION SPUTTER: (JFC 1100E: manufactured by JEOL Ltd.), and the obtained samples were used for observation. The electron microscopic morphology observation was carried out in a low vacuum mode by using the scanning electron microscope (JSM-6380LA; manufactured by JEOL Ltd.). The taken electron micrographs are shown in FIG. 2 to FIG. 4. It can be found that the starch particles were collapsed so as to form the pasty structure and the gelatinization of starch well proceeded in the inner layer of Example 1-1 (FIG. 2A) as compared to the inner layers of Comparative Examples 1-1 and 1-2 (FIG. 3A and FIG. 4A).

Experiment 2 <Verification of Effects in Non-Fry Noodles>

Example 2-1

The kneading water 450 mL made by dissolving salt 50 g and the polymeric phosphate 6 g was added in the main ingredient 1 kg made of wheat flour 750 g and starch 250 g, and the mixture was well kneaded by a mixer, to thereby obtain the noodle dough. This noodle dough was molded to form the noodle sheet shape having the thickness of 12 mm which was used as the inner layer noodle sheet. Next, the kneading water 410 mL made by dissolving the polymeric phosphate 6 g was added in the main ingredient powder 1 kg made of wheat flour 750 g and starch 250 g, and the mixture was well kneaded by a mixer, to thereby obtain the noodle dough. This noodle dough was molded and flat-rolled to form the two outer layer noodle sheets having the thickness of 4 mm. The former inner layer noodle sheet having the thickness of 12 mm and the latter outer layer noodle sheets having the thickness of 4 mm were combined so as to form the triple layer noodle sheet of outer layer/inner layer/outer layer. This triple layer noodle sheet was strongly flat-rolled by the flat-roller machine so as to adjust the final thickness of the noodle sheet after the flat-rolling to 2.0 mm. This noodle sheet was cut out by the cutting blade roll of the square blade No. 9, to thereby obtain the raw noodle lines. This raw noodle lines were steamed for 1 minute and 30 seconds, to thereby obtain the steamed noodle lines. These steamed noodle lines were soaked in the boiling bath at 95° C. for 30 seconds, and subsequently was soaked in the loosening solution. Then, the noodle lines were cut, and the noodles of one feed 180 g were charged in the retainer having the capacity of 380 ml. Thereafter, the noodle was dried by hot air at 80° C. to 140° C. for 60 minutes. The obtained instant non-fried noodles were referred to as Example 2-1.

Example 2-2

The instant non-fried noodles were obtained in the same blending and steps as in Example 2-1 except that the amount of salt in the outer layer noodle sheet relative to the main ingredient 1 kg was set to 0 g (the kneading water 410 mL) and the blending amount of salt in the inner layer noodle sheet relative to the main ingredient 1 kg was set to 80 g (the kneading water 480 mL). The obtained instant non-fried noodles were referred to as Example 2-2.

Comparative Example 2-1

The instant non-fried noodles were obtained in the same blending and steps as in Example 2-1 except that the blending amount of salt in the outer layer noodle sheet relative to the main ingredient 1 kg was set to 28 g (the kneading water 425 mL) and the blending amount of salt in the inner layer noodle sheet relative to the main ingredient 1 kg was set to 28 g (the kneading water 425 mL). The obtained instant non-fried noodles were referred to as Comparative Example 2-1. Table 3 shows the results of the sensory evaluations for Example 2-1, Example 2-2 and Comparative Example 2-1.

TABLE 3

| | Blending Amount of Salt relative to 100 parts by mass of Main Ingredient (parts by mass) | | Salt | | |
|---|---|---|---|---|---|
| | Outer Layer Noodle Sheet | Inner Layer Noodle Sheet | Content (mass %) | Sensory Evaluation | Comments |
| Example 2-1 | 0 | 5 | 1.12 | 4.5 | Reconstitution was good. |
| Example 2-2 | 0 | 8 | 1.50 | 5 | Reconstitution was good. |
| Comparative Example 2-1 | 2.8 | 2.8 | 1.19 | 2.5 | Reconstitution of noodle core was bad |

Experiment 3 <Verification of Effects Due to Number of Layers>

Next, the effects of the present invention due to the number of the layers that constitute the multilayer structure were verified.

Example 3-1 (Triple Layer)

The instant fried noodles were obtained in the same blending and steps as in Example 1-1 except that the thickness of the outer layer noodle sheet was set to 3 mm, the thickness of the inner layer noodle sheet was set to 6 mm, the amount of salt in the outer layer noodle sheet was set to 10 g (the kneading water 420 mL), and the final thickness of the noodle sheet was set to 1.8 mm. The obtained instant fried noodles were referred to as Example 3-1.

Example 3-2 (Quadruple Layer)

The kneading water 450 mL made by dissolving salt 50 g and the polymeric phosphate 5 g was added in the main ingredient 1 kg made of wheat flour 750 g and starch 250 g, and the mixture was well kneaded by a mixer, to thereby obtain the noodle dough. This noodle dough was molded and flat-rolled to form the two inner layer noodle sheets having the thickness of 3 mm. Next, the kneading water 420 mL made by dissolving salt 10 g and the phosphate 5 g was added in the main ingredient powder 1 kg made of wheat flour 750 g and starch 250 g, and the mixture was well kneaded by a mixer, to thereby obtain the noodle dough. This noodle dough was molded and flat-rolled to form the two outer layer noodle sheets having the thickness of 3 mm.

The two inner layer noodle sheets having the thickness of 3 mm and the two outer layer noodle sheets having the thickness of 3 mm were combined so as to form the quadruple layer noodle sheet of outer layer/inner layer/inner layer/outer layer. This quadruple layer noodle sheet was strongly flat-rolled by the flat-roller machine so as to adjust the final thickness of the noodle sheet after the flat-rolling to 1.8 mm. This noodle sheet was cut out by the cutting blade roll of the square blade No. 9, to thereby obtain the raw noodle lines. This raw noodle lines were steamed, boiled and then dried in the same blending and steps as in Example 3-1. The obtained quadruple layer structure instant fried noodles were referred to as Example 3-2.

Comparative Example 3-1 (Double Layer)

The kneading water 420 mL made by dissolving salt 10 g and the phosphate 5 g was added in the main ingredient powder 1 kg made of wheat flour 750 g and starch 250 g, and the mixture was well kneaded by a mixer, to thereby obtain the noodle dough. This noodle dough was molded to form the noodle sheet shape having the thickness of 6 mm. The two noodle sheets having the thickness of 6 mm were combined so as to form the double layer noodle sheet. This double layer noodle sheet was strongly flat-rolled by the flat-roller machine so as to adjust the final thickness of the noodle sheet after the flat-rolling to 1.8 mm. This noodle sheet was cut out by the cutting blade roll of the square blade No. 9, to thereby obtain the raw noodle lines. This raw noodle lines were steamed, boiled and then dried under the same conditions as in Examples 3-1 and 3-2. The obtained double layer structure instant fried noodles were referred to as Comparative Example 3-1. Obtained Example 3-1 and 3-2 and Comparative Example 3-1 were subjected to the sensory evaluation in the same manner as in Experiment 1. The results are shown in Table 4.

TABLE 4

| | Number of Layers | Thickness of Each Layer (mm) | Ratio of Outer Layer:Inner layer | Salt Content (mass %) | Sensory Evaluation | Comments |
|---|---|---|---|---|---|---|
| Example 2-1 | 3 | 3:6:3 | 1:1 | 1.14 | 5 | Reconstitution was good. |
| Example 2-2 | 4 | 3:3:3:3 | 1:1 | 1.04 | 5 | Reconstitution was good. |
| Comparative Example 2-1 | 2 | 6:6 | — | 0.33 | 2 | Core parts of noodle lines were hard. |

Experiment 4 <Verification of Effects Due to Variation of Thickness Ratio Between Outer Layer Noodle Sheet and Inner Layer Noodle Sheet>

The thickness ratio between the outer layer noodle sheet and the inner layer noodle sheet were varied, and the effects of the present invention were verified. The instant fried noodles were obtained in the same blending and steps as in Example 1-1 except that the amount of salt in the outer layer noodle sheet relative to the main ingredient 1 kg was set to 10 g (the kneading water 420 mL), the amount of salt in the inner layer noodle sheet relative to the main ingredient 1 kg was set to 50 g (the kneading water 450 mL), the thicknesses of the outer layer noodle sheets and inner layer noodle sheet were varied as shown in Table 5, and the final thickness of the noodle sheet was set to 1.8 mm. The obtained instant fried noodles were referred to as Examples 4-1 to 4-7.

TABLE 5

| | Thickness of Each Layer Outer Layer:Inner layer:Outer Layer (mm) | Ratio of Outer Layer:Inner layer | Salt Content (mass %) | Sensory Evaluation | Comments |
|---|---|---|---|---|---|
| Example 4-1 | 1:8:1 | 2:8 | 1.69 | 4 | Reconstitution was almost good, but surface part had texture as being dissolved. |
| Example 4-2 | 2:8:2 | 2:4 | 1.44 | 4.5 | Reconstitution was almost good, but surface part had texture as being dissolved. |
| Example 4-3 | 2:6:2 | 2:3 | 1.29 | 5 | Reconstitution was good. |
| Example 4-4 | 3:6:3 | 2:2 | 1.10 | 5 | Reconstitution was good. |

TABLE 5-continued

|  | Thickness of Each Layer Outer Layer:Inner layer:Outer Layer (mm) | Ratio of Outer Layer:Inner layer | Salt Content (mass %) | Sensory Evaluation | Comments |
|---|---|---|---|---|---|
| Example 4-5 | 6:6:6 | 2:1 | 0.72 | 5 | Reconstitution was good. |
| Example 4-6 | 4:2:4 | 4:1 | 0.56 | 3 | Reconstitution was almost good, but insufficiently reconstituted part rarely remains. |
| Example 4-7 | 4.5:1.5:4.5 | 6:1 | 0.47 | 3 | Reconstitution was almost good, but insufficiently reconstituted part rarely remains. |

The ratio of the total thickness of the outer layer noodle sheets and the thickness of the inner layer noodle sheet was preferably within a range of 2:1 to 2:8, more preferably a range of 2:1 to 2:4, and more preferably 2:1 to 2:3.

Experiment 5 <Verification of Effects Due to Variation of Blending Amount of Salt>

The blending amounts of salt in the outer layer noodle sheet and the inner layer noodle sheet were varied as shown in Table 6, and the effects of the present invention were verified. The instant fried noodles were obtained in the same blending and steps as in Example 1-1 except that the thicknesses of the triple structure of outer layer/inner layer/outer layer before sandwiching the inner layer noodle sheet between the outer layer noodle sheets were respectively set to 3 mm/6 mm/3 mm, and the final thickness of the noodle sheet was set to 1.8 mm. The obtained instant fried noodles were referred to as Examples 5-1 to 5-11 and Comparative Examples 5-1 to 5-2. The results of the sensory evaluation are shown in Table 6.

TABLE 6

|  | Blending Amount of Salt relative to 100 parts by mass of Main Ingredient (parts by mass) | | Salt Content (mass %) | Sensory Evaluation | Comments |
|---|---|---|---|---|---|
|  | Outer Layer Noodle Sheet | Inner Layer Noodle Sheet |  |  |  |
| Comparative Example 2-1 | 1 | 1 | 0.31 | 2.5 | Reconstitution of noodle core was bad |
| Example 5-1 |  | 2 | 0.50 | 3.5 | Reconstitution was almost good, but insufficiently reconstituted part rarely remains. |
| Example 5-2 |  | 4 | 0.92 | 5 | Reconstitution was good. |
| Example 5-3 |  | 6 | 1.30 | 5 | Reconstitution was good. |
| Example 5-4 |  | 8 | 1.74 | 5 | Reconstitution was good, but the salty taste was slightly strong. |
| Example 5-5 |  | 10 | 2.12 | 5 | Reconstitution was good, but the salty taste was slightly strong. |
| Example 5-6 |  | 12 | 2.91 | 5 | Reconstitution was good, but the salty taste was slightly strong. |
| Example 5-7 |  | 14 | 3.40 | 5 | Noodle was easy to cut, and the salty taste was very strong. |
| Example 5-8 | 0 | 4 | 0.80 | 5 | Reconstitution was good. |
| Example 5-9 | 1 |  | 0.98 | 5 | Reconstitution was good. |
| Example 5-10 | 2 |  | 1.09 | 5 | Reconstitution was good. |
| Example 5-11 | 3 |  | 1.33 | 4 | Reconstitution was almost good, but surface part had texture as being dissolved. |
| Comparative Example 2-1 | 4 |  | 1.58 | 2.5 | Outer layer part was soft, and hardness balance between outer layer part and inner layer part was bad. |

According to the results shown in Table 6, the reconstitution properties were good or almost good in the Examples where the blending amount of salt in the inner layer noodle sheet was higher than the blending amount of salt in the outer layer noodle sheet. On the other hand, in the Comparative Examples where the blending amount of salt in the inner layer noodle sheet was the same as the blending amount of salt in the outer layer noodle sheet, the reconstitution of the noodle core became bad (Comparative Example 5-1). Also, the outer layer part was soft, and the hardness balance between outer layer part and inner layer part became bad (Comparative Example 5-2).

Moreover, in the Examples where the value, which was obtained by subtracting the blending amount of salt in the outer layer noodle sheets from the blending amount of salt in the inner layer noodle sheet relative to 100 parts by weight of the main ingredient, was 2 parts by mass or more, the reconstitution of the instant noodles was good (Examples 5-2 to 5-10). On the other hand, in the Examples where the value, which was obtained by subtracting the blending amount of salt in the outer layer noodle sheets from the blending amount of salt in the inner layer noodle sheet relative to 100 parts by weight of the main ingredient, was less than 2 parts by mass even though the blending amount of salt in the inner layer noodle sheet was higher than the blending amount of salt in the outer layer noodle sheet, the reconstitution of the instant noodles was almost good, but the insufficiently reconstituted part rarely remained (Example 5-1). Also, the reconstitution of the instant noodles was almost good, but the surface part had the texture as being dissolved (Example 5-11).

INDUSTRIAL APPLICABILITY

In the multilayer structure instant noodle of the present invention, the gelatinization of the inside of the noodle lines proceeds well, and thus, the present invention can be used preferably to reconstitute the instant noodles having thick noodle lines.

REFERENCE SIGNS LIST

11 Inner layer noodle sheet
12 Outer layer noodle sheet

The invention claimed is:

1. A multilayer structure instant noodle which is manufactured by sandwiching an inner layer noodle sheet between outer layer noodle sheets such that the inner layer and outer layer noodle sheets are combined to form a single noodle sheet, the single noodle sheet is flat-rolled so as to form noodle lines, and the noodle lines are gelatinized and dried, wherein
the inner layer noodle sheet and outer layer noodle sheets comprise i) at least one main ingredient selected from the group consisting of wheat flour, buckwheat flour, rye flour, barley flour and starch, ii) salt, and iii) water,
a value, which is obtained by subtracting the blending amount of the salt in the outer layer noodle sheets from the blending amount of the salt in the inner layer noodle sheet relative to 100 parts by mass of the main ingredient, is 2 parts by mass or more and 14 parts by mass or less, and
the ratio of the total thickness of the outer layer noodle sheets before sandwiching the inner layer noodle sheet between the outer layer noodle sheets to the thickness of the inner layer noodle sheet is within a range of 2:1 to 2:3.

2. The multilayer structure instant noodle according to claim 1, wherein the blending amount of the salt in the inner layer noodle sheet is within a range of 3.5 to 14 parts by mass relative to 100 parts by mass of the main ingredient.

3. The multilayer structure instant noodle according to claim 1, wherein the blending amount of the salt in the inner layer noodle sheet is within a range of 4 to 12 parts by mass relative to 100 parts by mass of the main ingredient.

4. A manufacturing method of a multilayer structure instant noodle, comprising:
forming an inner layer noodle sheet and outer layer noodle sheets;
sandwiching the inner layer noodle sheet between the outer layer noodle sheets such that the inner layer and outer layer noodle sheets are combined to form a single noodle sheet;
flat-rolling and then cutting out the combined noodle sheet having a multilayer structure so as to form raw noodle lines;
gelatinizing the raw noodle lines; and
drying the gelatinized noodle lines, wherein
the inner layer noodle sheet and outer layer noodle sheets comprise i) at least one main ingredient selected from the group consisting of wheat flour, buckwheat flour, rye flour, barley flour and starch, ii) salt, and iii) water,
a value, which is obtained by subtracting the blending amount of the salt in the outer layer noodle sheets from the blending amount of the salt in the inner layer noodle sheet relative to 100 parts by mass of the main ingredient, is 2 parts by mass or more and 14 parts by mass or less, and
the ratio of the total thickness of the outer layer noodle sheets before sandwiching the inner layer noodle sheet between the outer layer noodle sheets to the thickness of the inner layer noodle sheet is within a range of 2:1 to 2:3.

5. The manufacturing method of a multilayer structure instant noodle according to claim 4, wherein the blending amount of the salt in the inner layer noodle sheet is within a range of 3.5 to 14 parts by mass relative to 100 parts by mass of the main ingredient.

6. The manufacturing method of a multilayer structure instant noodle according to claim 4, wherein the blending amount of the salt in the inner layer noodle sheet is within a range of 4 to 12 parts by mass relative to 100 parts by mass of the main ingredient.

* * * * *

UNITED STATES PATENT AND TRADEMARK OFFICE
CERTIFICATE OF CORRECTION

PATENT NO. : 9,723,862 B2
APPLICATION NO. : 14/418013
DATED : August 8, 2017
INVENTOR(S) : Yukio Hirano Page 1 of 1

It is certified that error appears in the above-identified patent and that said Letters Patent is hereby corrected as shown below:

In the Specification

In Column 11 at Line 8, Change "lines" to --line--.

Signed and Sealed this
Twenty-seventh Day of March, 2018

Andrei Iancu
*Director of the United States Patent and Trademark Office*